(No Model.) 2 Sheets—Sheet 1.

W. B. HARGAN.
ANIMAL TRAP.

No. 590,723. Patented Sept. 28, 1897.

Witnesses
Molbry Haynes
L. B. Hodge.

Inventor
William B. Hargan
By Joshua B. Webster
Attorney (No Model.) 2 Sheets—Sheet 2.

W. B. HARGAN.
ANIMAL TRAP.

No. 590,723. Patented Sept. 28, 1897.

Witnesses
Mulbry Haynes.
L. B. Hodge.

Inventor
William B. Hargan
By Joshua B. Webster
Attorney

UNITED STATES PATENT OFFICE.

WILLIAM B. HARGAN, OF STOCKTON, CALIFORNIA.

ANIMAL-TRAP.

SPECIFICATION forming part of Letters Patent No. 590,723, dated September 28, 1897.

Application filed January 25, 1897. Serial No. 620,716. (No model.)

*To all whom it may concern:*

Be it known that I, WILLIAM B. HARGAN, a citizen of the United States, residing at Stockton, in the county of San Joaquin and State of California, have invented certain new and useful Improvements in Animal-Traps; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to certain improvements in animal-traps such as are designed to effectually catch and retain vermin in large numbers; and it consists in the peculiar construction, novel combination, and adaptation of parts hereinafter described, and specifically pointed out in the claims hereunto annexed.

Figure 1:
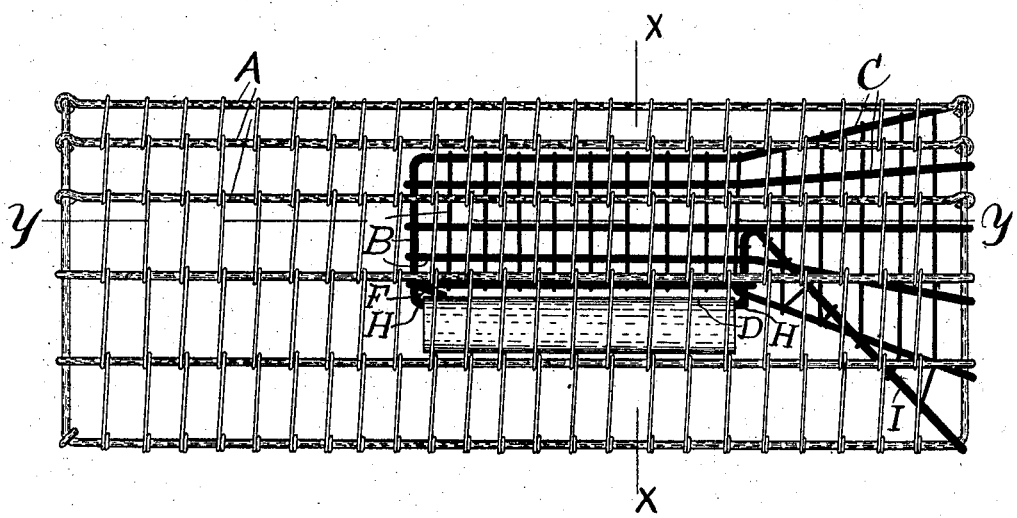
Figure 2:
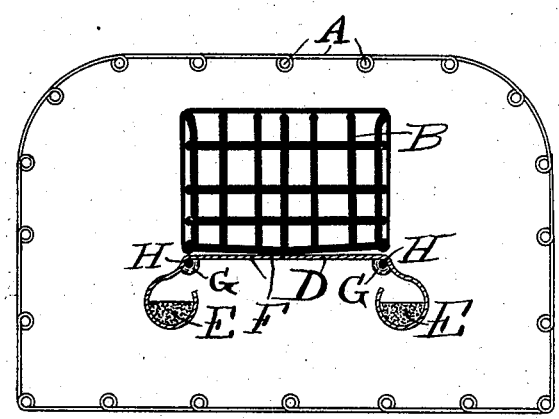
Figure 3:
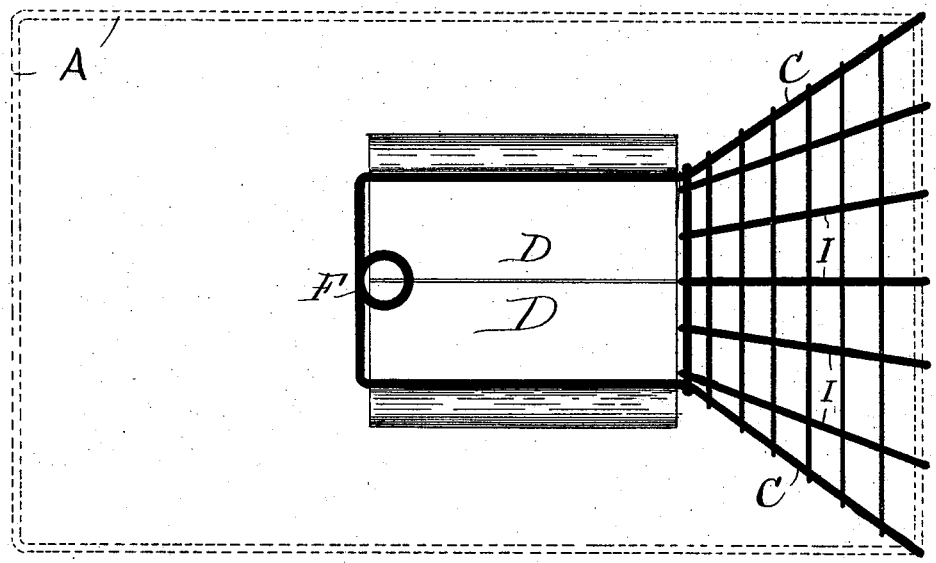
Figure 4:
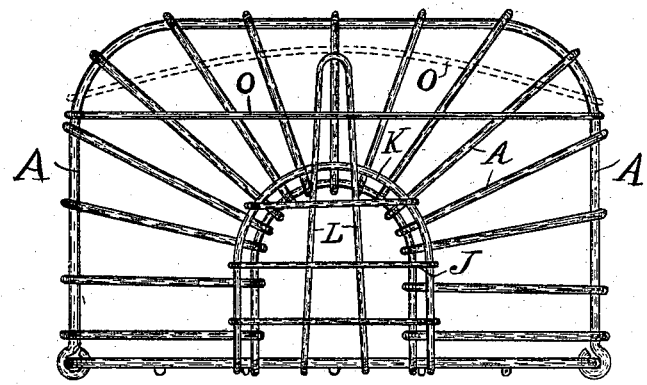

Referring to the accompanying drawings, Figure 1 is a side elevation of my improved animal-trap. Fig. 2 is a vertical section through line X X, Fig. 1. Fig. 3 is a horizontal section through line Y Y, Fig. 1. Fig. 4 is a rear view of my animal-trap, showing the rear door.

Similar letters of reference indicate corresponding parts throughout the several views.

A represents the framework of an inclosure, which is of any suitable shape and size and has one end open for the purpose of admitting a rectangular parallelepipedon-shaped wire inclosure B, which is provided with an opening in the outer end which communicates with the outside of the trap by means of a funnel-shaped inclosure C, such inclosure being rigidly attached to the sides of the end of the trap-frame A and having its apex end within the inclosure A. A double trap-door D, each part of which is pivotally attached to the lower wire H of the inclosure B, forms the bottom of such inclosure B.

The outer sides of the trap-doors D are curved under for the purpose of holding a sufficient amount of weight material E to return the doors D to their normal closed positions after they have been opened by a rat jumping on and falling through the same.

The doors D are maintained in normal position by means of the lower end wire F, which is bent so as to rest upon the doors D, as shown in Fig. 3. The trap-doors D are attached in position by means of staples G, which comprehend the supporting-wire H and are rigidly attached to such doors D, which are provided with smooth surfaces, thereby preventing the vermin from climbing out.

The bottom wires I of the funnel-shaped inclosure C are raised so as to form a ridge across the opening in the inclosure B for the purpose as will be shown.

The rear end of the trap is provided with an opening for the purpose of removing the vermin from the trap. Such opening is provided with a door J, which is pivotally attached at the bottom of the same to the base-wire of the trap.

The door J is composed of a marginal wire K, which is an inverted-U shape, such door J being provided with suitable cross-wires and a double vertical wire L, which vertical wire extends above the curve of the wire K and is adapted to engage with a horizontal locking-wire O, which is attached to the end frame-wires of the trap proper and adapted to maintain the door in closed position. The dotted lines, Fig. 4, show the position of the wire O while the door is being opened and closed.

The mode of operating my improved animal-trap is as follows: Suitable bait being suitably attached to the inner end of the inclosure B the vermin enter the funnel-shaped opening C to the highest point of the wires I, which being above the trap-doors D such vermin will jump out upon the doors D for the purpose of reaching the bait, whereupon the doors D will give way under its weight, thus allowing the vermin to fall through the doors into the inclosure A. The doors D when relieved of their extra weight, being so adjusted, will resume their normal position, and the trap is in readiness for another vermin, and so on until the inclosure A is filled. To liberate the vermin thus caught, the locking-wire O is raised above the top of the wire L, and the door J is tilted downwardly, thus allowing the vermin to escape through the opening. The door is then closed and the wire O replaced, and the *modus operandi* is repeated.

I am aware that animal-traps have been made with a single trap-door which tilts endwise, but these are defective and inoperative, wherefore I do not claim such feature broadly; but What I do claim as new, and desire to secure by Letters Patent, is—

1. In an animal-trap the combination with a suitable inclosure of the funnel-shaped inclosure C, I, the parallelepipedon-shaped inclosure B rigidly attached to the apex end of the inclosure C, the trap-doors D, pivotally attached to the wire H, the staples G comprehending the wires H and rigidly attached to the doors D, the weights E suitably attached to the outer sides of such doors D, and the wire F adapted to engage with the doors D, all arranged and operating substantially as and for the purposes shown and described.

2. In an animal-trap the combination with a suitable inclosure A of the funnel-shaped inclosure C, I, rigidly attached to the sides of the end of the inclosure A, the parallelepipedon-shaped inclosure B rigidly attached to the apex end of the inclosure C, the trap-doors D, pivotally attached to the wire H, the staples G adapted to comprehend the wires H, and rigidly attached to the doors D, the weights E suitably attached to the outer sides of such doors D, the wire F adapted to engage with the doors D, the door J pivotally attached to the bottom wire of the rear end of the inclosure A, the double wire L rigidly attached to the door J, and the lock-wire O attached to the frame of the inclosure A, all arranged and operating substantially as and for the purposes shown and described.

In testimony whereof I affix my signature in presence of two witnesses.

WILLIAM B. HARGAN.

Witnesses:
JOSHUA B. WEBSTER,
MALBRY HAYNES.